United States Patent
Cavallaro, Jr.

(10) Patent No.: US 7,017,727 B2
(45) Date of Patent: Mar. 28, 2006

(54) EXTERIOR CHUTE LOADED WOOD TRANSPORTATION AND STORAGE DEVICE

(76) Inventor: Joseph L. Cavallaro, Jr., 146 Plymouth Dr. Apartment B, Norwood, MA (US) 02062

( * ) Notice: Subject to any disclaimer, the term of this patent is extended or adjusted under 35 U.S.C. 154(b) by 0 days.

(21) Appl. No.: 10/770,056

(22) Filed: Feb. 2, 2004

(65) Prior Publication Data

US 2005/0167236 A1    Aug. 4, 2005

(51) Int. Cl.
*B65G 11/16* (2006.01)

(52) U.S. Cl. .......................... 193/33; 193/2 R; 193/2 A
(58) Field of Classification Search ................ 193/2 R, 193/5, 6, 25 R, 25 A, 33, 2 A, 34; 198/950; 232/1 E, 42, 41 A; 52/196
See application file for complete search history.

(56) References Cited

U.S. PATENT DOCUMENTS

| | | | | |
|---|---|---|---|---|
| 773,596 A * | 11/1904 | Roenius | ........................ | 193/34 |
| 800,064 A * | 9/1905 | Boyd | .......................... | 193/34 |
| 965,624 A * | 7/1910 | Drever | ......................... | 193/34 |
| 1,390,178 A * | 9/1921 | Taylor | .......................... | 193/34 |
| 1,455,511 A * | 5/1923 | Triggs | .......................... | 193/34 |
| 1,789,123 A * | 1/1931 | Triggs | .......................... | 193/33 |
| 1,824,502 A * | 9/1931 | Robinson | ..................... | 193/34 |
| 2,742,994 A * | 4/1956 | Towner | ....................... | 193/34 |
| 4,098,454 A * | 7/1978 | Easter | ......................... | 232/19 |
| 4,136,762 A * | 1/1979 | Rosinbaum et al. | .......... | 193/34 |
| 4,278,163 A * | 7/1981 | Tomich | ....................... | 193/34 |
| 4,987,988 A * | 1/1991 | Messina et al. | ............. | 193/2 R |
| 5,806,759 A * | 9/1998 | Axisa | .......................... | 232/44 |
| 5,941,362 A * | 8/1999 | Preston | ........................ | 193/34 |
| 6,050,390 A * | 4/2000 | Fortenbery et al. | .... | 198/370.03 |

* cited by examiner

*Primary Examiner*—Douglas Hess
(74) *Attorney, Agent, or Firm*—Lambert & Associates; Gary E. Lambert; Melissa Patangia

(57) ABSTRACT

A transportation device for transferring material from a higher elevation at an outdoor location to a lower elevation at an indoor location, such as a basement, via a chute assembly, specifically an exterior chute loaded wood transportation and storage device. The chute may be of varying lengths depending on the distance to be traveled. The chute may remain in position or be removed when not in use with corresponding closure means to prevent precipitation, animals, or outdoor air from entering the house. A wood storage bin, with holes to facilitate air flow, may be placed near the foot of the chute in the indoor location to receive and store the wood.

6 Claims, 8 Drawing Sheets

EXTERIOR CHUTE LOADED WOOD TRANSPORTATION AND STORAGE DEVICE

FIELD OF THE INVENTION

The present invention relates generally to a transportation device for transferring items from a higher elevation to a lower elevation via a chute assembly, and in particular to an exterior chute loaded wood transportation and storage device.

BACKGROUND OF INVENTION

There are many occasions when an individual may need to transport items, such as wood, from an outdoor location at a higher elevation to an indoor location at a lower elevation, such as a basement. It is not always convenient to store wood exclusively outdoors when the wood is to be used indoors. In the past, it has been necessary for individuals to transport such items by hand down flight(s) of stairs. Often times, multiple trips are required to complete the task. In addition to being tiresome, this situation can also pose safety issues through the repetitious trips up and down the flight(s) of stairs. Further, storing wood outdoors does not appropriately prepare the wood for use in an indoor fireplace or wood-fired stove. For these reasons, a safer, easier device to transport these materials is needed.

SUMMARY OF THE INVENTION

The present invention involves a transportation device for transferring items from a higher elevation to a lower elevation via a chute assembly. The present invention is an exterior chute loaded wood transportation and storage device for transferring wood from an outdoor location to an indoor location, such as a basement. The chute assembly of the present invention includes a chute; an exterior window flush plate; an interior bevel plate; hangars a means for restricting motion such as a locking pin; joist hangar brackets; and connecting means such as a threaded rod. In another embodiment of the present invention, the chute assembly also includes anti-sway bars, handles, a locking rod, an open position slot, and a closed position slot.

Optionally, a wood storage bin may be placed at the foot of the chute assembly to receive the material, such as wood, which is placed in the chute assembly. In order to facilitate the circulation of air around the wood, the wood storage bin can contain numerous holes.

The chute may be either permanently fixed in position or may be removable through loosening of the means for restricting motion. When not in use, the chute may remain in place provided the exterior portion of the chute is equipped with a chute closure device to prevent precipitation, small animals, or outdoor air from entering the house. The exterior portion of the chute may be equipped with a chute closure device, which fits securely in place, of sufficient size to provide complete coverage of the exterior portion of the chute. Further, the exterior portion of the chute may be equipped with a chute covering means, which locks into the closed position, to prevent precipitation, small animals, or outdoor air from entering the house. In order to remove and prevent accumulating water, the exterior portion of the chute must contain drainage holes.

As an alternative, when not in use, the chute may be removed by loosening the means for restricting motion. When the chute is removed, both the exterior window flush plate and interior bevel plate can also be removed to allow the basement window to close as before in order to prevent precipitation, small animals, or outdoor air from entering the house. As an alternative to the removal of the exterior window flush plate and interior bevel plate, an exterior covering means and an interior covering means respectively, which locks into the closed position, may be placed over the exterior window flush plate and/or the interior bevel plate to prevent precipitation, small animals, or outdoor air from entering the house.

Further, as another alternative, when not in use, the chute may be placed in the closed or stored position. To place the chute in the closed or stored position, first, the means for restricting motion is pulled out of the open position slot. Second, the chute slides forward towards the basement floor until the means for restricting motion locks into place at the closed position slot. Third, the basement window may now close.

The chute may be of varying diameters to accommodate variously sized wood. Further, the number of hangars and corresponding joist hangar brackets may vary depending on the distance to be traveled.

These and other features, aspects and advantages of the present invention will become better understood with reference to the following description, claims, and accompanying drawings. Therefore, the form of the invention, as set out above, should be considered illustrative and not as limiting the scope of the following claims.

DESCRIPTION OF THE INVENTION

The preferred embodiment of the present invention represents a chute assembly as shown in FIGS. 1, 1a–7.

Figure 1:
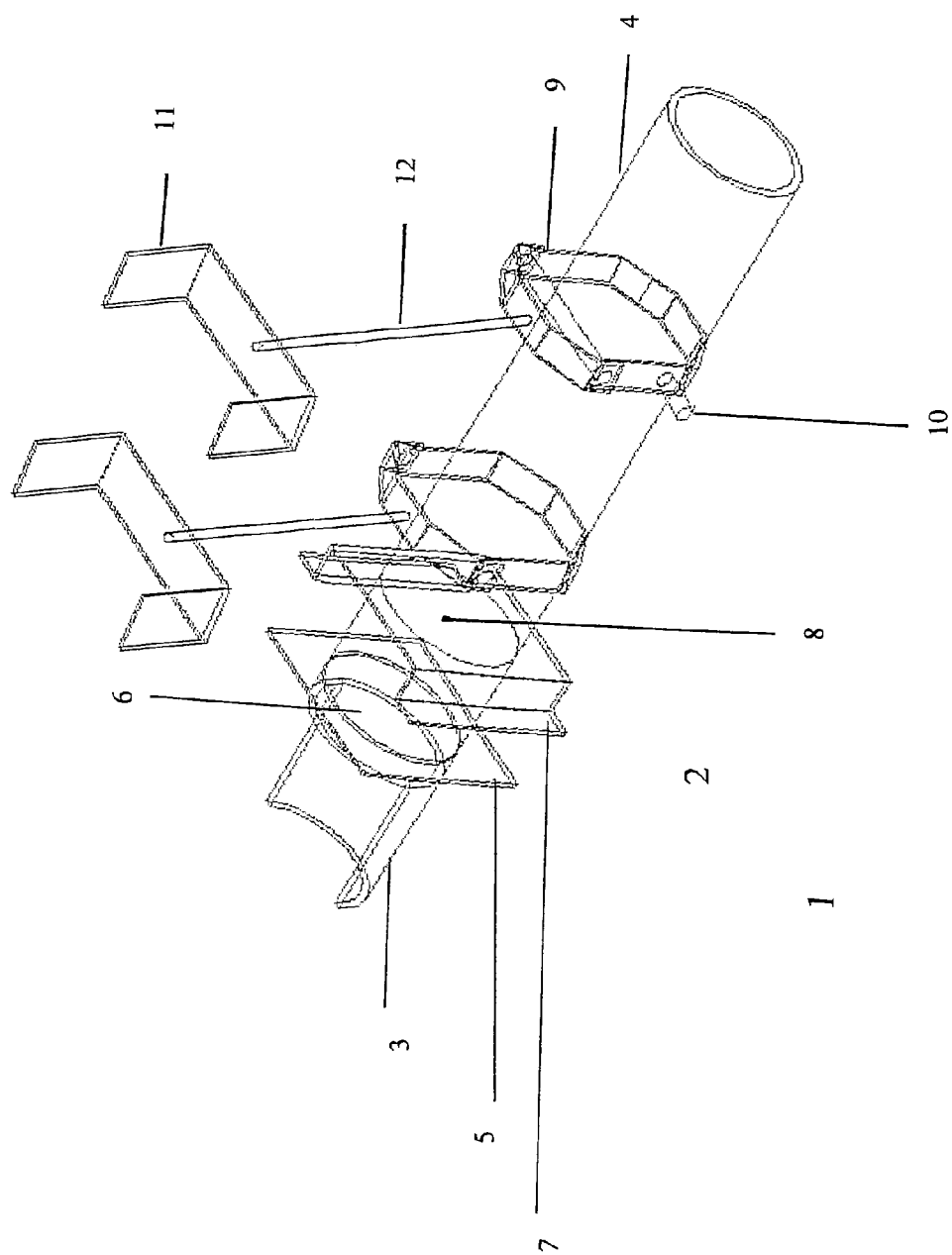
FIG. 1 is a view of the chute assembly.

With reference to FIG. 1, FIG. 1 depicts a chute assembly 1. The chute assembly 1 includes a chute 2 containing an exterior portion 3 and an interior portion 4. The chute 2 depicted in FIG. 1 has a cylindrical shape. The chute 2 may be constructed of polyvinyl chloride (PVC) plastic. The chute 2 depicted in FIG. 1 possesses a cut away portion to assist in the loading of the chute 2 for the transfer of material such as wood.

Further with reference to FIG. 1, the chute assembly 1 also includes an exterior window flush plate 5 containing an exterior opening 6 of sufficient size to allow the passage of the chute 2; an interior bevel plate 7 containing an interior opening 8 of sufficient size to allow the passage of the chute 2. The exterior window flush plate 5 and the interior bevel plate 7 will typically mounted on either side of a basement window. The chute assembly 1 also includes at least one hangar 9 for securing and positioning the chute 2 where at least one hangar 9 is equipped with a means for restricting motion 10; at least one joint hangar bracket 11 for securing and positioning the chute 2 where the number of joist hangar brackets 11 equals the number of hangars 9; and at least one connecting means 12 for connecting the hangars 9 and the joist hangar brackets 11. The joist hangar brackets 11 are typically mounted on the joists of a basement ceiling. The hangars 9, means for restricting motion 10, joist hangar brackets 11, and connecting means 12 may be constructed of metal.

Further with reference to FIG. 1, the connecting means 11 depicted in FIG. 1 are of varying lengths to allow for and to create a downward angle of the chute 2. Further, the interior opening 8 of the interior bevel plate 7 is lower than the exterior opening 6 of the exterior window flush plate 5 to allow for and to create a downward angle of the chute 2. The downward angle of the chute 2 will facilitate the transfer of material such as wood through the chute 2.

Further with reference to FIG. 1, FIG. 1 depicts one embodiment of the present invention where the chute assembly 1 includes two hangars 9 where the last interior hangar 9 is equipped with the means for restricting motion 10; two joist hangar brackets 11; and two connecting means 12. Another embodiment of the chute assembly 1 includes a single hangar 9 equipped with a means for restricting motion 10; a single joist hangar bracket 11; and a single connecting means 12.

Figure 1A:
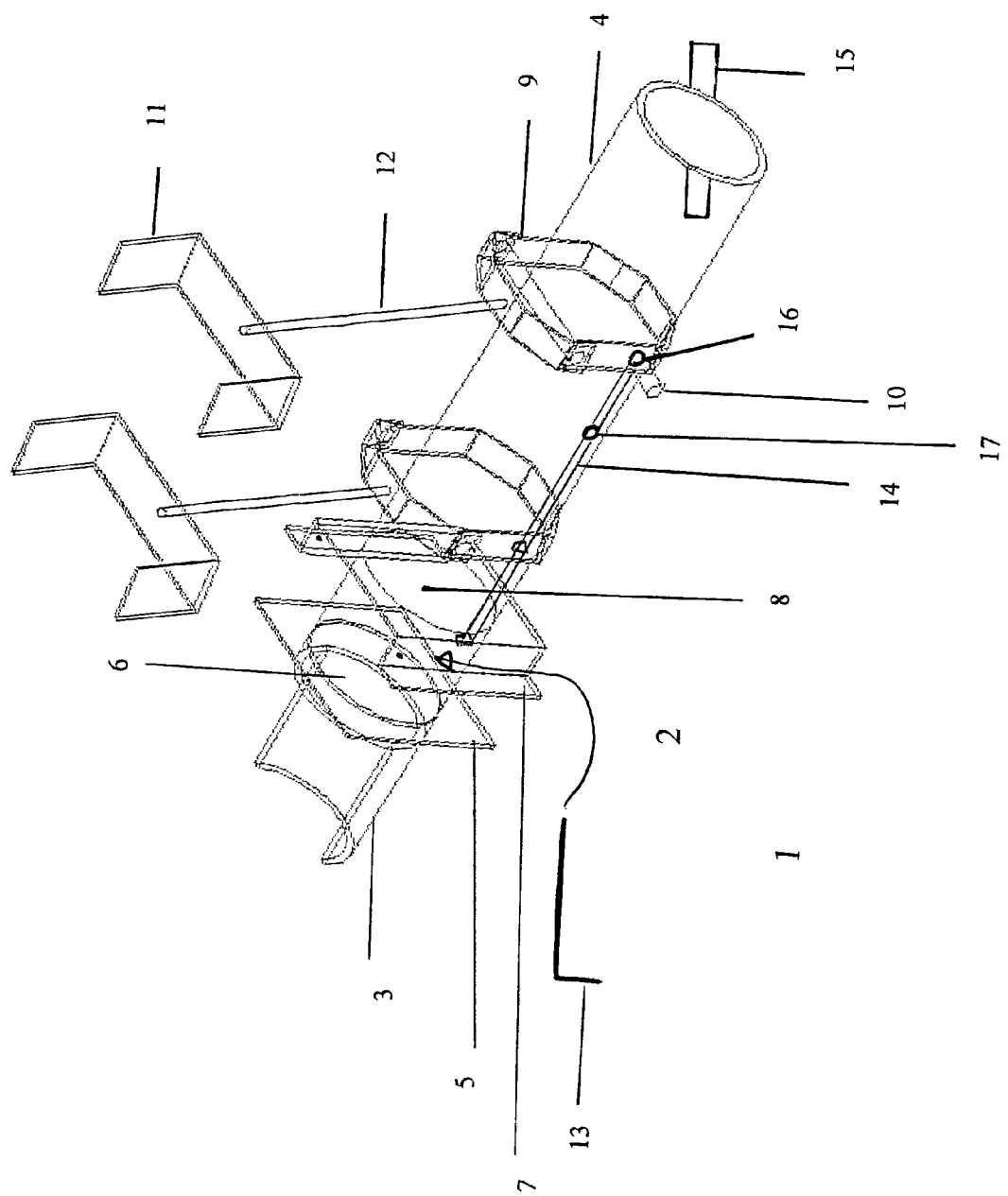
FIG. 1a is a view of the chute assembly in the open position.

With reference to FIG. 1a, FIG. 1a depicts another embodiment of the present invention where the chute assembly 1 in the open position also includes a locking rod 13, anti-sway bars 14, handles 15, an open position slot 16, and a closed position slot 17.

Figure 2:
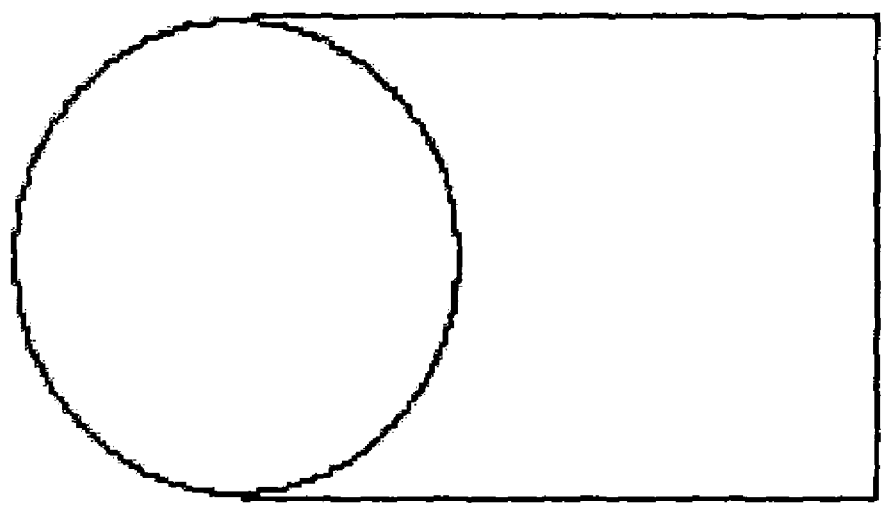
FIG. 2 is a view of the chute closure device, which completely covers the exterior portion of the chute when the chute is not in use.

With reference to FIG. 2, FIG. 2 depicts the chute closure device 18. In one embodiment of the present invention, the chute closure device 18 completely covers the exterior portion 3 of the chute 2 when the chute 2 is not in use and fits securely in place. The chute closure device 18 is necessary to prevent precipitation, small animals, or outdoor air from entering the house.

Figure 3:
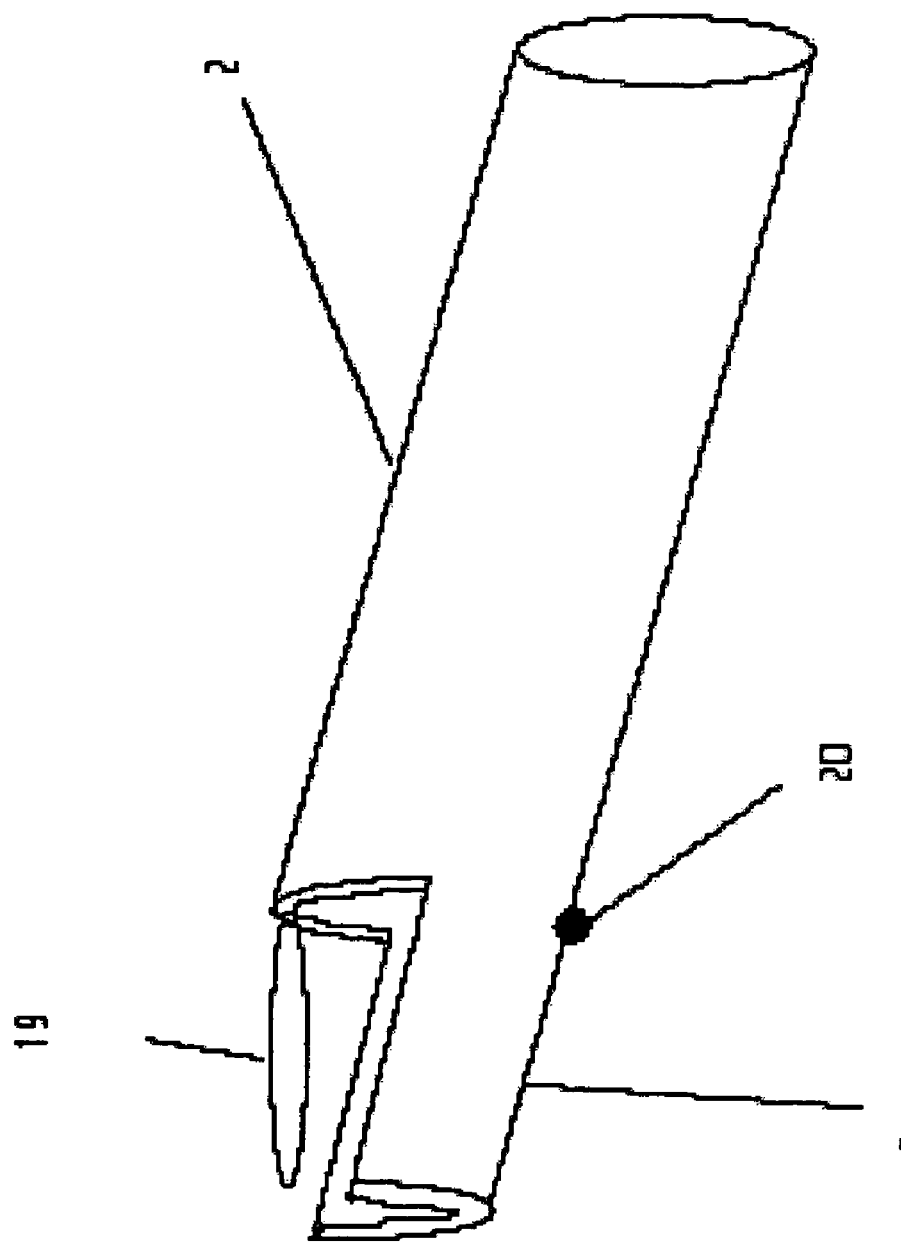
FIG. 3 is a view of the chute with a chute covering means, which locks into position, and drainage hole(s)

With reference to FIG. 3, FIG. 3 depicts the chute covering means 19. In one embodiment of the present invention, the chute covering means 19 locks into position to seal the entrance of the chute 2 when the chute 2 is not in use. The chute covering means 19 is necessary to prevent precipitation, small animals, or outdoor air from entering the house. Further, the exterior portion 3 of the chute 2 contains a drainage hole 20 in order to remove and prevent the accumulation of water.

Figure 4:
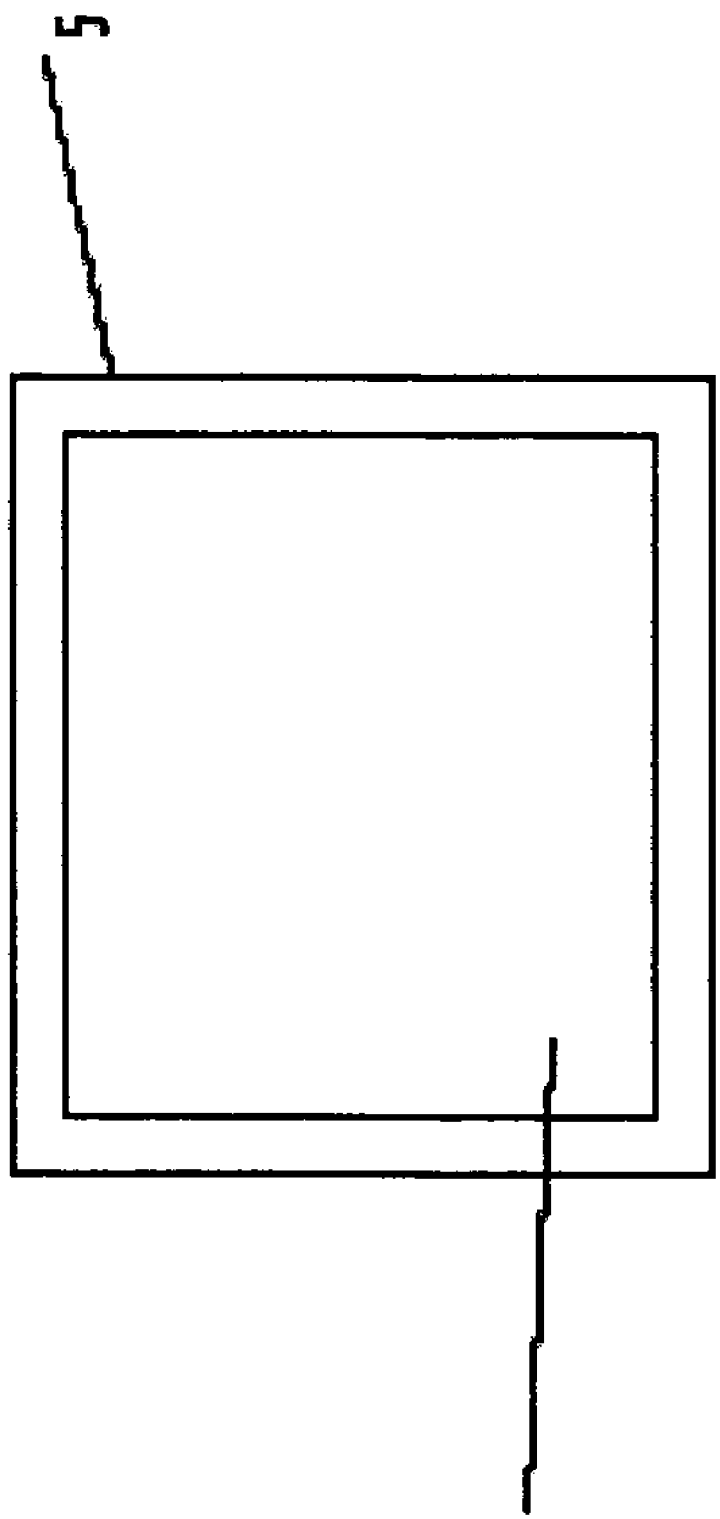
FIG. 4 is a view of the exterior covering means, which locks into position over the exterior opening of the exterior window flush plate once the chute has been removed.

With reference to FIG. 4, FIG. 4 depicts the exterior covering means 21. In another embodiment of the present invention, in which the chute 2 is removed by loosening the means for restricting motion 10, the exterior covering means 21 locks into position over the exterior opening 6 of the exterior window flush plate 5. The exterior covering means 21 is necessary to prevent precipitation, small animals, or outdoor air from entering the house.

Figure 5:
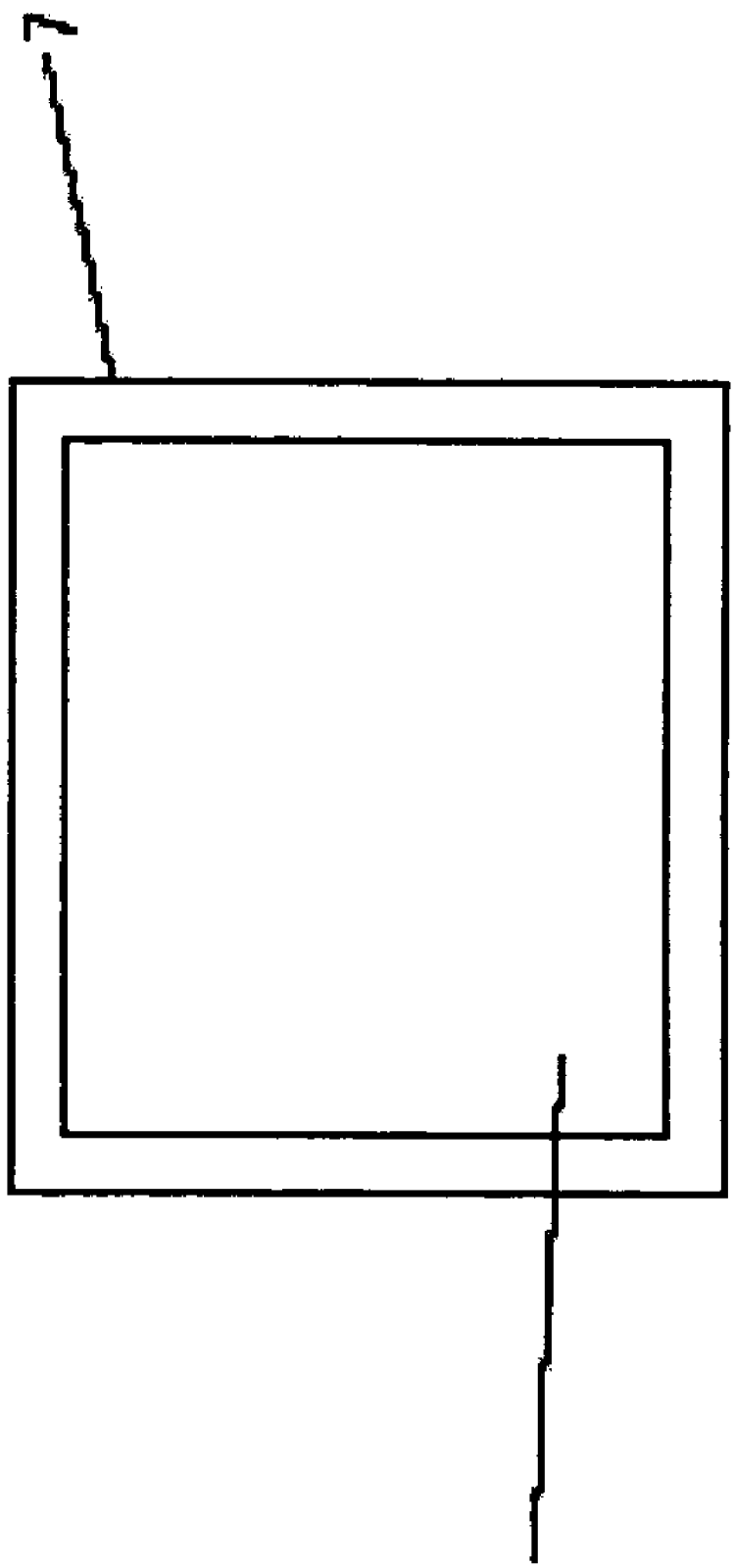
FIG. 5 is a view of the interior covering means, which locks into position over the interior opening of the interior bevel plate once the chute has been removed.

With reference to FIG. 5, FIG. 5 depicts the interior covering means 22. In another embodiment of the present invention, in which the chute 2 is removed by loosening the means for restricting motion 10, the interior covering means 22 locks locked into position over the interior opening 8 of the interior bevel plate 7. The interior covering means 22 is necessary to prevent precipitation, small animals, or outdoor air from entering the house.

Figure 6:
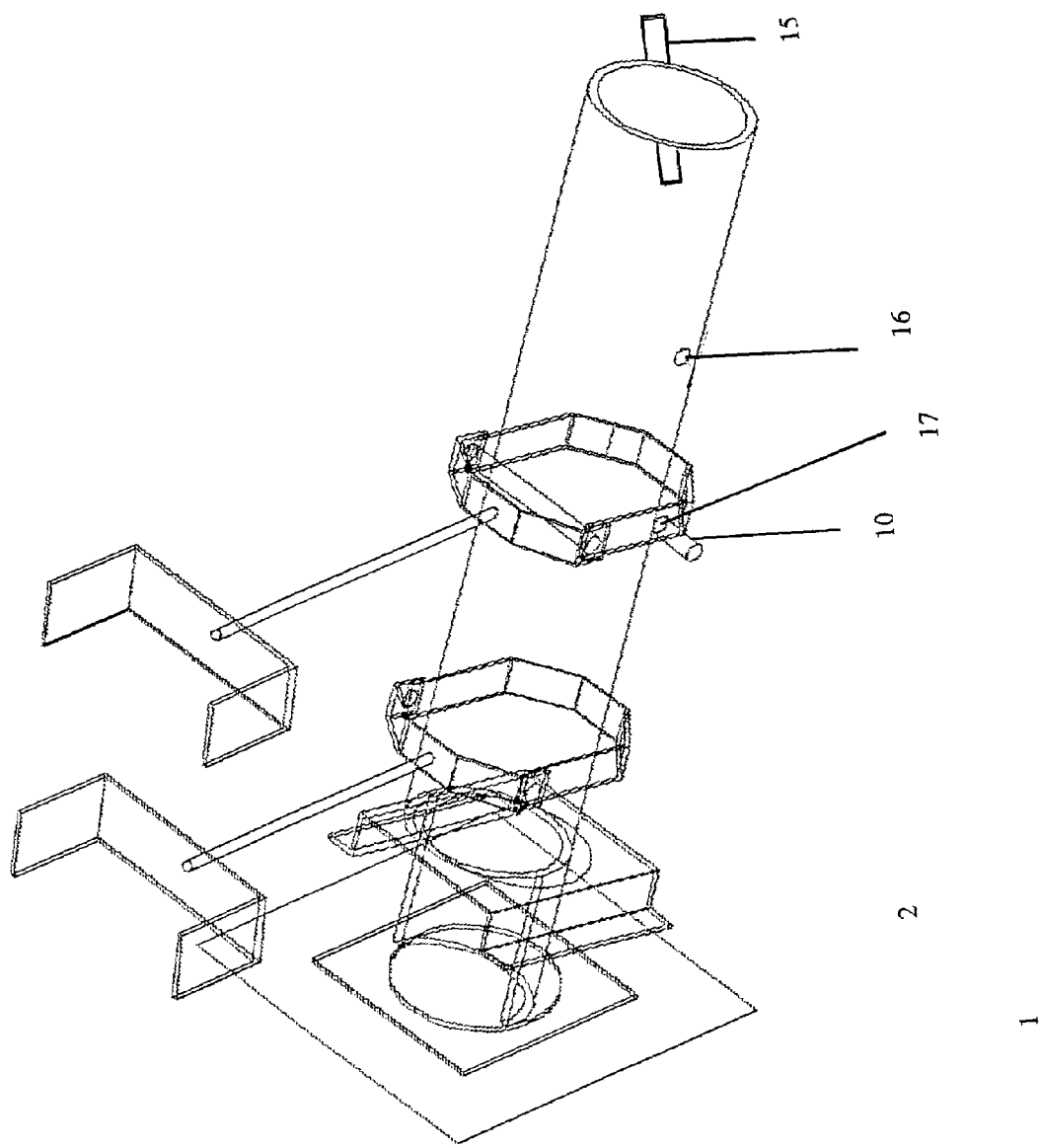
FIG. 6 is a view of the chute assembly in the closed position.

With reference to FIG. 6, FIG. 6 depicts the chute assembly 1 in the closed position. When not in use, the chute 2 is placed in the closed position. To place the chute 2 in the closed position, first, the means for restricting motion 10 is pulled out of the open position slot 16. Second, by pulling on the handles 15 the chute 2 slides forward towards the basement floor until the means for restricting motion 10 locks into place at the closed position slot 17. Third, the basement window may now close. The angle of the chute 2 in the closed position is much steeper than the angle of the chute 2 in the open position. The cut away portion of the chute 2 allows the chute 2 to be placed at this steeper angle in the closed position. This steeper angle will allow any wood debris, in particular any wet wood debris, to fall downward.

Figure 7:
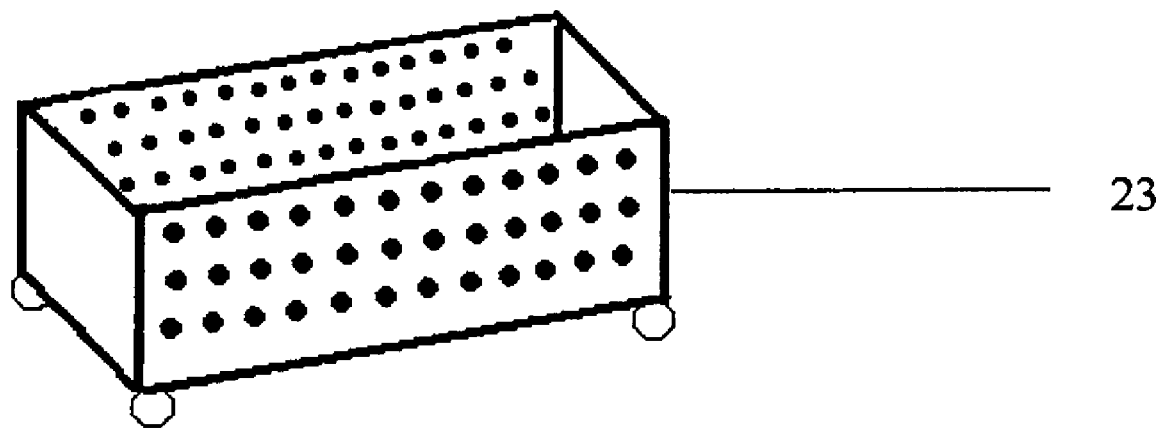
FIG. 7 is a view of the wood storage bin.

With reference to FIG. 7, FIG. 7 depicts a wood storage bin 23 that can be optionally placed substantially near the end of the interior portion 4 of the chute 2. The wood storage bin 23 contains a plurality of holes to facilitate the drying of the wood placed in the wood storage bin 23.

What is claimed is:

1. A method for closing a retractable chute comprising:
pulling a means for restricting motion out of a open position slot of said retractable chute;
pulling on at least one handle of said retractable chute to slide said retractable chute forward towards a basement floor until said means for restricting motion locks into place at a closed position slot; and
closing a basement window.

2. A chute assembly comprising:
a chute containing an exterior portion and an interior portion;
an exterior window flush plate containing an exterior opening of sufficient size to allow the passage of said chute;
an interior bevel plate containing an interior opening of sufficient size to allow the passage of said chute;
at least one hangar for securing and positioning said chute wherein said at least one hangar is equipped with a means for restricting motion;
at least one joist hangar bracket for securing and positioning said chute wherein the number of said at least one joist hangar bracket is equal to the number of said at least one hangar;
at least one connecting means for connecting said at least one hangar and said at least one joist hangar bracket for securing said chute in position;
said chute assembly is located in a basement consisting of a basement window, a basement ceiling, and a basement floor;
said exterior window flush plate is securely attached to the exterior of said basement window; said interior bevel plate is securely attached to the interior of said basement window; and said at least one joist hangar bracket are attached to the joists of said basement ceiling.

3. A chute assembly comprising:
a chute containing an exterior portion and an interior portion;
an exterior window flush plate containing an exterior opening of sufficient size to allow the passage of said chute;
an interior bevel plate containing an interior opening of sufficient size to allow the passage of said chute;
at least one hangar for securing and positioning said chute wherein said at least one hangar is equipped with a means for restricting motion;

at least one joist hangar bracket for securing and positioning said chute wherein the number of said at least one joist hangar bracket is equal to the number of said at least one hangar;

at least one connecting means for connecting said at least one hangar and said at least one joist hangar bracket for securing said chute in position;

said chute assembly is located in a basement consisting of a basement window, a basement ceiling, and a basement floor;

said wood storage bin is located on said basement floor substantially near the end of said interior portion of said chute;

said wood storage bin contains a plurality of holes to allow the flow of air through said wood storage bin.

4. A chute assembly comprising a chute containing an exterior portion and an interior portion;

an exterior window flush plate containing an exterior opening of sufficient size to allow the passage of said chute;

an interior bevel plate containing an interior opening of sufficient size to allow the passage of said chute;

at least one hangar for securing and positioning said chute wherein said at least one hangar is equipped with a means for restricting motion;

at least one joist hangar bracket for securing and positioning said chute wherein the number of said at least one joist hangar bracket is equal to the number of said at least one hangar;

at least one connecting means for connecting said at least one hangar and said at least one joist hangar bracket for securing said chute in position;

at least one anti-sway bar connected to said at least one hangar and said interior bevel plate;

at least one handle connected to the interior end of said chute;

a locking rod for securing said chute in the closed position;

an open position slot for receiving said means for restricting motion when said chute is in the open position; and a closed position slot for receiving said means for restricting motion when said chute is in the closed position.

5. The chute assembly of claim 4 wherein said chute is internally retractable such that an obstruction is placed over said exterior opening.

6. The chute assembly of claim 5 where said obstruction is a window.

* * * * *